(12) United States Patent
Marion et al.

(10) Patent No.: US 9,386,009 B1
(45) Date of Patent: Jul. 5, 2016

(54) SECURE IDENTIFICATION STRING

(71) Applicant: MOBILE IRON, INC., Mountain View, CA (US)

(72) Inventors: Eric M. Marion, Cambridge, MA (US); Nitin Sonawane, Littleton, MA (US)

(73) Assignee: MOBILE IRON, INC., Mountain View, CA (US)

( * ) Notice: Subject to any disclaimer, the term of this patent is extended or adjusted under 35 U.S.C. 154(b) by 97 days.

(21) Appl. No.: 13/669,089

(22) Filed: Nov. 5, 2012

Related U.S. Application Data

(60) Provisional application No. 61/555,191, filed on Nov. 3, 2011.

(51) Int. Cl.
*H04L 29/06* (2006.01)
*H04L 9/32* (2006.01)

(52) U.S. Cl.
CPC ............ *H04L 63/083* (2013.01); *H04L 9/3226* (2013.01)

(58) Field of Classification Search
CPC ......... G06F 21/30; G06F 21/31; G06F 21/60; G06F 21/62; H04L 9/08; H04L 9/0802; H04L 9/0813; H04L 9/0863; H04L 9/088; H04L 9/32; H04L 9/3202; H04L 9/321; H04L 9/3226
See application file for complete search history.

(56) References Cited

U.S. PATENT DOCUMENTS

| | | | |
|---|---|---|---|
| 5,737,422 A * | 4/1998 | Billings | H04L 9/3226 713/159 |
| 6,151,606 A | 11/2000 | Mendez | |
| 6,986,050 B2 * | 1/2006 | Hypponen | G06F 21/78 380/277 |
| 7,702,322 B1 | 4/2010 | Maurya et al. | |
| 7,945,452 B2 * | 5/2011 | Fathallah | G06F 19/3406 705/2 |
| 7,957,532 B2 * | 6/2011 | Chen et al. | 380/270 |
| 7,970,386 B2 | 6/2011 | Bhat et al. | |
| 7,984,303 B1 * | 7/2011 | Ma | G06F 21/32 713/182 |
| 8,012,219 B2 | 9/2011 | Mendez et al. | |
| 8,135,135 B2 * | 3/2012 | Biddle | G06F 11/1415 380/286 |
| 8,543,836 B2 * | 9/2013 | Brown | G06F 21/6218 713/189 |
| 8,577,692 B2 * | 11/2013 | Silkaitis et al. | 705/2 |
| 2002/0034305 A1 * | 3/2002 | Noyama | H04L 9/3213 380/282 |
| 2003/0087627 A1 * | 5/2003 | Cannon | H04M 1/67 455/404.1 |
| 2003/0120925 A1 * | 6/2003 | Rose | G06Q 20/341 713/176 |
| 2004/0250273 A1 * | 12/2004 | Swix | H04N 21/4122 725/25 |
| 2007/0061868 A1 * | 3/2007 | Dvir | G07B 7/00 726/2 |
| 2007/0112603 A1 * | 5/2007 | Kauthen | G06F 19/322 705/3 |

(Continued)

*Primary Examiner* — Dede Zecher
*Assistant Examiner* — Richard McCoy
(74) *Attorney, Agent, or Firm* — Van Pelt, Yi & James LLP

(57) ABSTRACT

Providing secure access to a mobile or other device using a network-assisted PIN or other short password is disclosed. In various embodiments, upon entry by a user of a personal identification number (PIN) or other short password, the password and a unique identifier, such as a user and/or device identifier, and/or other data, are sent to a remote server. The remote server returns to the mobile or other device a cryptographic key and/or other data, such as a more secure (e.g., more characters and/or including characters drawn from a larger set of characters) password usable at the mobile device to access encrypted data.

25 Claims, 9 Drawing Sheets

(56) References Cited

U.S. PATENT DOCUMENTS

| | | | |
|---|---|---|---|
| 2007/0220594 A1* | 9/2007 | Tulsyan | G06F 21/31 726/5 |
| 2007/0297610 A1* | 12/2007 | Chen | H04L 9/0822 380/270 |
| 2008/0201749 A1* | 8/2008 | Liu | H04N 7/1675 725/100 |
| 2009/0112765 A1* | 4/2009 | Skowronek | G06Q 20/32 705/44 |
| 2010/0034389 A1* | 2/2010 | Sakharov | G06F 21/10 380/277 |
| 2010/0115268 A1* | 5/2010 | Kudo | H04L 63/0815 713/156 |
| 2010/0228987 A1* | 9/2010 | Dinov | G06F 21/41 713/183 |
| 2011/0197266 A1* | 8/2011 | Chu | H04L 9/3228 726/5 |
| 2011/0282697 A1* | 11/2011 | Fitzgerald | G06F 21/88 705/4 |
| 2012/0280917 A1* | 11/2012 | Toksvig | G06F 1/1626 345/173 |
| 2013/0198824 A1* | 8/2013 | Hitchcock | G06F 21/00 726/6 |

\* cited by examiner

SECURE IDENTIFICATION STRING

CROSS REFERENCE TO OTHER APPLICATIONS

This application claims priority to U.S. Provisional Patent Application No. 61/555,191 entitled SYSTEM AND TECHNIQUE TO SECURELY ADOPT A NUMERICAL PIN filed Nov. 3, 2011 which is incorporated herein by reference for all purposes.

BACKGROUND OF THE INVENTION

Most modern day digital devices encrypt data with a user-supplied password. This strategy keeps the device and the data it holds under a lock. Only the person with knowledge of the password can readily access the device. In order to provide strong security, this password has to be of sufficient length and complexity. Otherwise, an adversary can guess it. For example, a common practice is to use a simple numerical pin (typically 4-digit). Such a pin is a weak security mechanism since an adversary has to only guess a limited number of combinations (10000 for a 4-digit pin). Requiring a long alphanumeric password unfortunately has a user experience problem. When a user wishes to access the device, he or she has to enter this password (typically either through a touch screen based software keyboard or a physical keyboard on the device). Entering this password is cumbersome, error prone and often causes delays. Thus there is a tradeoff between usability and security.

It is a practice on some devices to simply use a small numerical pin (e.g., 4-digit). Such a pin provides very weak security since an adversary has to only guess a limited number of combinations (10000 for a 4-digit pin). Furthermore, someone with physical access to the device can perform a brute force search quickly—his speed is only limited by how many PIN-cracking CPUs he can use. It is therefore recommended that a password not simply be a numerical password but also include alphabet characters as well as special characters (e.g., !@#$%ˆ, etc.). It's also recommended that there is a rate limit on password attempts, but this isn't always feasible, such as an entirely-on-phone cryptosystem. For example, for an entirely-on-phone system, attempts to rate limit password entry may be overcome by an attacker with physical access to the device, for example by modifying the device to bypass the password and/or password entry rate limiting requirement and/or by offloading device data to a computer and using a brute force attack to gain access in spite of the rate limiting requirement. Drawing from such a diverse set of characters means that every single character of the password can come from a large number of possibilities. For example, using all characters on a typical QWERTY keyboard results in 90 different possible characters. The second recommendation is that a password be at least 8 characters long. This increases the number of guessable combinations to over 4000-trillion combinations. A numerical pin provides a significantly less secure password than a long password comprised of all alphanumerical characters.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Providing secure access to a mobile or other device using a network-assisted PIN or other short password is disclosed. In various embodiments, upon entry by a user of a personal identification number (PIN) or other short password, the password and a unique identifier, such as a user and/or device identifier, are sent to a remote server. The remote server uses the PIN and the identifier to look up and return to the mobile or other device a more secure (e.g., more characters and/or including characters drawn from a larger set of characters) password or other key usable at the mobile device to access encrypted data. In some embodiments, the PIN itself is not sent to the remote server. Instead trusted code on the device determines that the correct PIN has been entered and sends to the server a request that informs the server that the PIN has been determined at the device to have been entered correctly. In some embodiments, the server returns to the device a cryptographic key to enable encrypted data to be access at the device.

Figure 1:
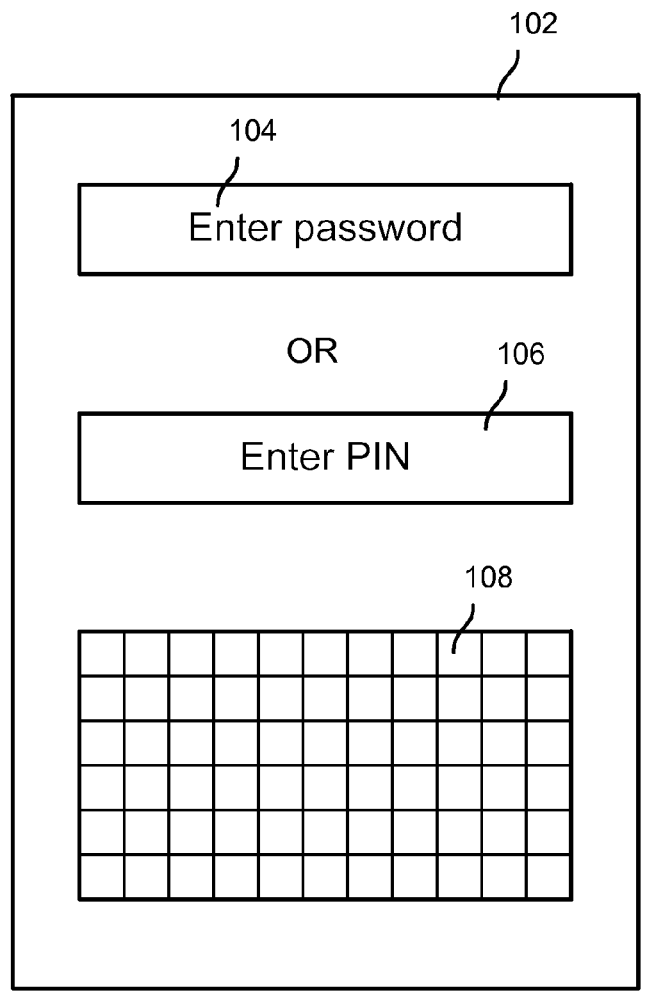
FIG. 1 is a block diagram illustrating an embodiment of a mobile device user interface.

FIG. 1 is a block diagram illustrating an embodiment of a mobile device user interface. In the example shown, a mobile device access user interface 102 includes a first form field 104 usable to enter a full (relatively longer) password or, at the option of the user, a second form field 106 usable to enter a relatively shorter PIN, such as a four digit numeric PIN. If the user touches or otherwise selects the first form field 104, in some embodiments a fully QWERTY "soft" keyboard 108 is displayed to enable a complete password, comprising for example alphanumeric and/or special characters, to be entered. In some embodiments, if the PIN entry field 106 is selected, the soft keyboard 108 toggles to a simple ten digit numeric keypad, e.g., one having relatively larger keys to make it easier for the user to enter accurately the four digit numeric PIN. While in some embodiments a four digit or other numeric PIN is used, in other embodiments other short passwords may be used, such as a simple word, a combination of letters and numbers, a biometric input like a fingerprint or retina scan, etc. In the example shown in FIG. 1 either the shorter PIN or the complete password may be entered. In other embodiments, an interface to enter just the PIN may be presented. In some embodiments, an option to enter the full password may be provided, for example to enable offline access to encrypted data.

Figure 2:
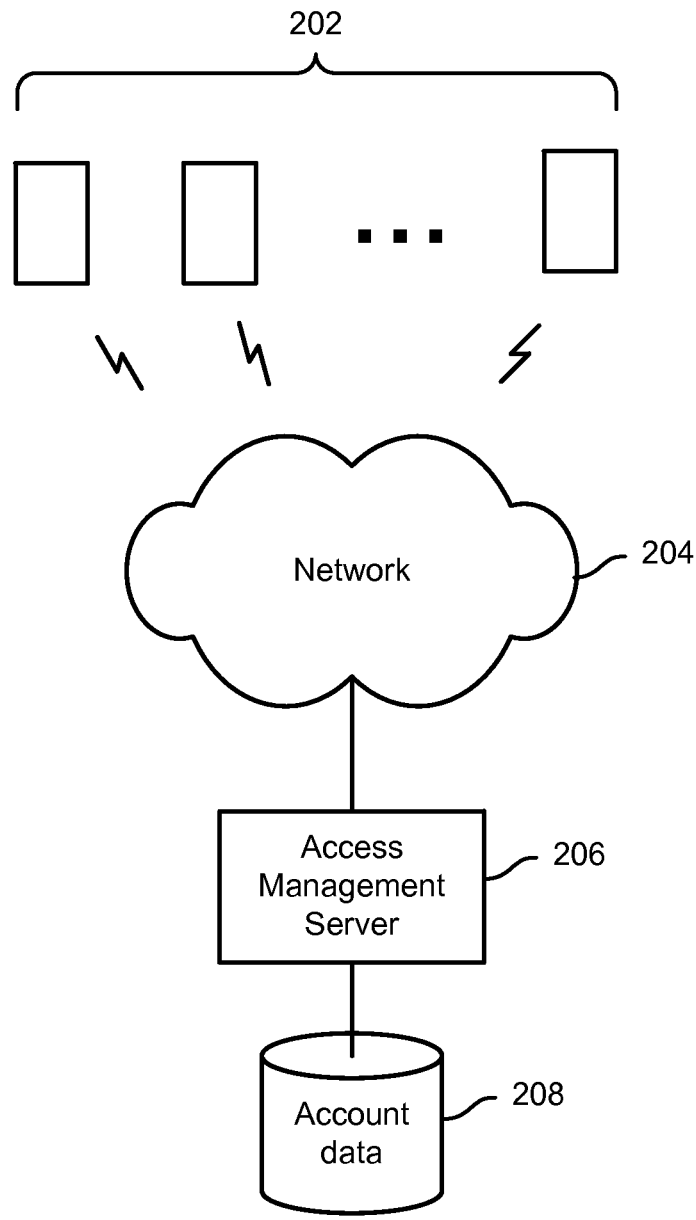
FIG. 2 is a block diagram illustrating an embodiment of a network assisted secure PIN system.

FIG. 2 is a block diagram illustrating an embodiment of a network assisted secure PIN system. In the example shown, each of a plurality of mobile devices 202 is configured to provide user access at least in part by communicating via network 204 with an access management server 206. For example, a mobile device 202 may send a user-entered PIN or other short password and a unique identifier via network 204 to access management server 206. Access management server 206 is configured in various embodiments to use a received PIN and identifier to look up and return to a mobile device from which the PIN was received a corresponding password looked up in account data 208.

Figure 3:
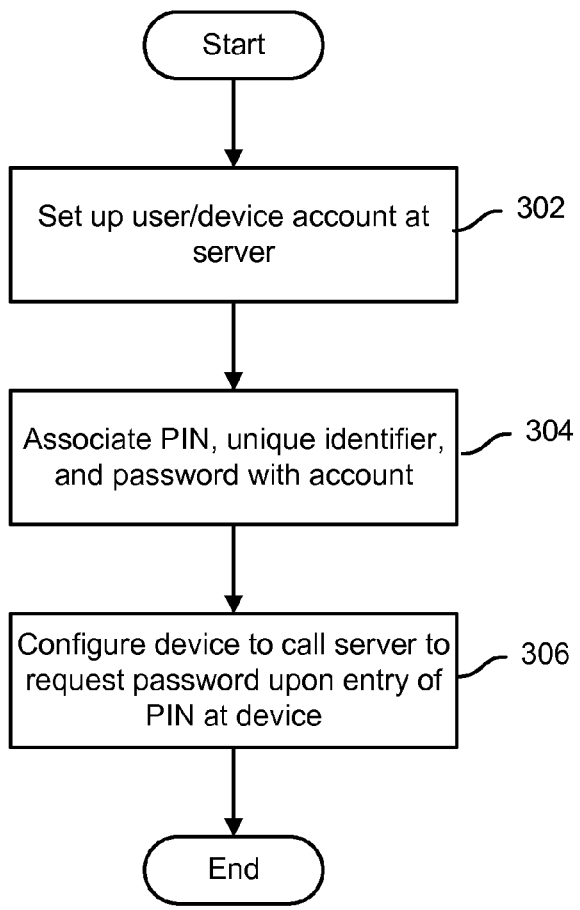
FIG. 3 is a flow chart illustrating an embodiment of a process to provide a network assisted PIN.

FIG. 3 is a flow chart illustrating an embodiment of a process to provide a network assisted PIN. In some embodiments, the process of FIG. 3 is implemented by an administrator or other user authorized to configure a mobile device. In the example shown, a user and/or device account is set up (302), for example at an access management server such as server 206 of FIG. 2. A user-selected or other PIN, a user and/or device associated unique identifier, and a full (longer and/or otherwise more complex than the PIN) password are associated with the user account (304). The corresponding mobile or other device is configured to send to the server, upon entry of a PIN, a request that includes the PIN and the unique identifier, and to use the password received in response to provide access to encrypted data (306).

Figure 4:
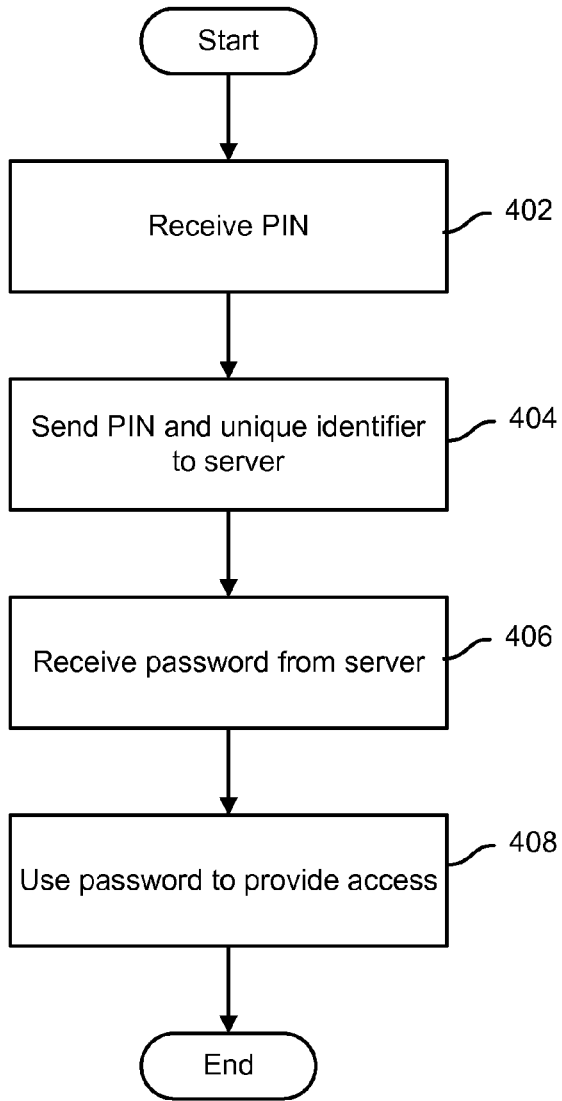
FIG. 4 is a flow chart illustrating an embodiment of a process to provide access to a mobile device.

FIG. 4 is a flow chart illustrating an embodiment of a process to provide access to a mobile device. In some embodiments, the process of FIG. 4 is implemented on a mobile device. In the example shown, a PIN is received (402), for example via a user interface such as interface 102 of FIG. 1. The PIN and a unique user and/or device identifier are sent to a remote access management server (404). A password is received from the server (406) and used to provide the user with access to encrypted data on the mobile device (408).

Figure 5:
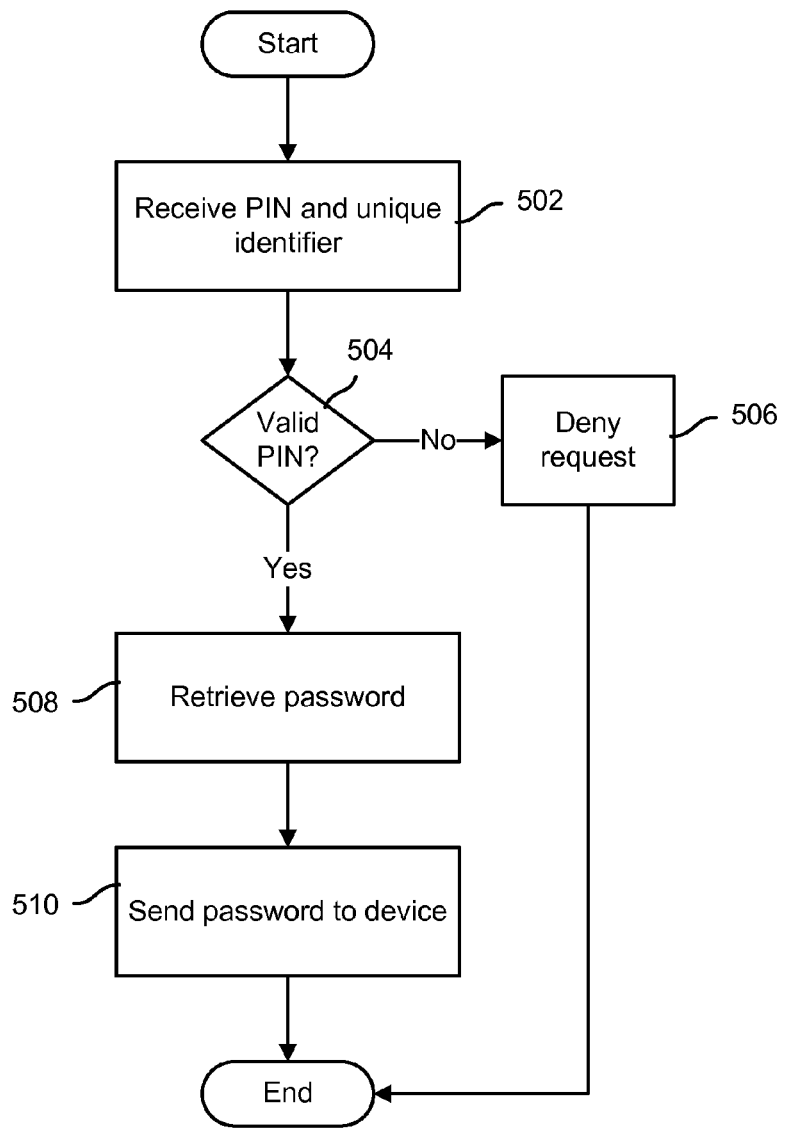
FIG. 5 is a flow chart illustrating an embodiment of a process to provide secure access to a mobile device.

FIG. 5 is a flow chart illustrating an embodiment of a process to provide secure access to a mobile device. In some embodiments, the process of FIG. 5 is implemented on an access management server, such as server 206 of FIG. 2. In the example shown, a PIN and unique identifier are received (502), e.g., from a mobile device. If the PIN is not valid (504), e.g., the received PIN does not match a valid PIN data stored at the server side, then access is denied (506), for example by sending an access denied message to the mobile device. If the received PIN is determined to be valid (504), a corresponding password is retrieved (508), for example from stored data associated with the user and/or device account, and the retrieved password is sent to the mobile device (510).

Figure 6:
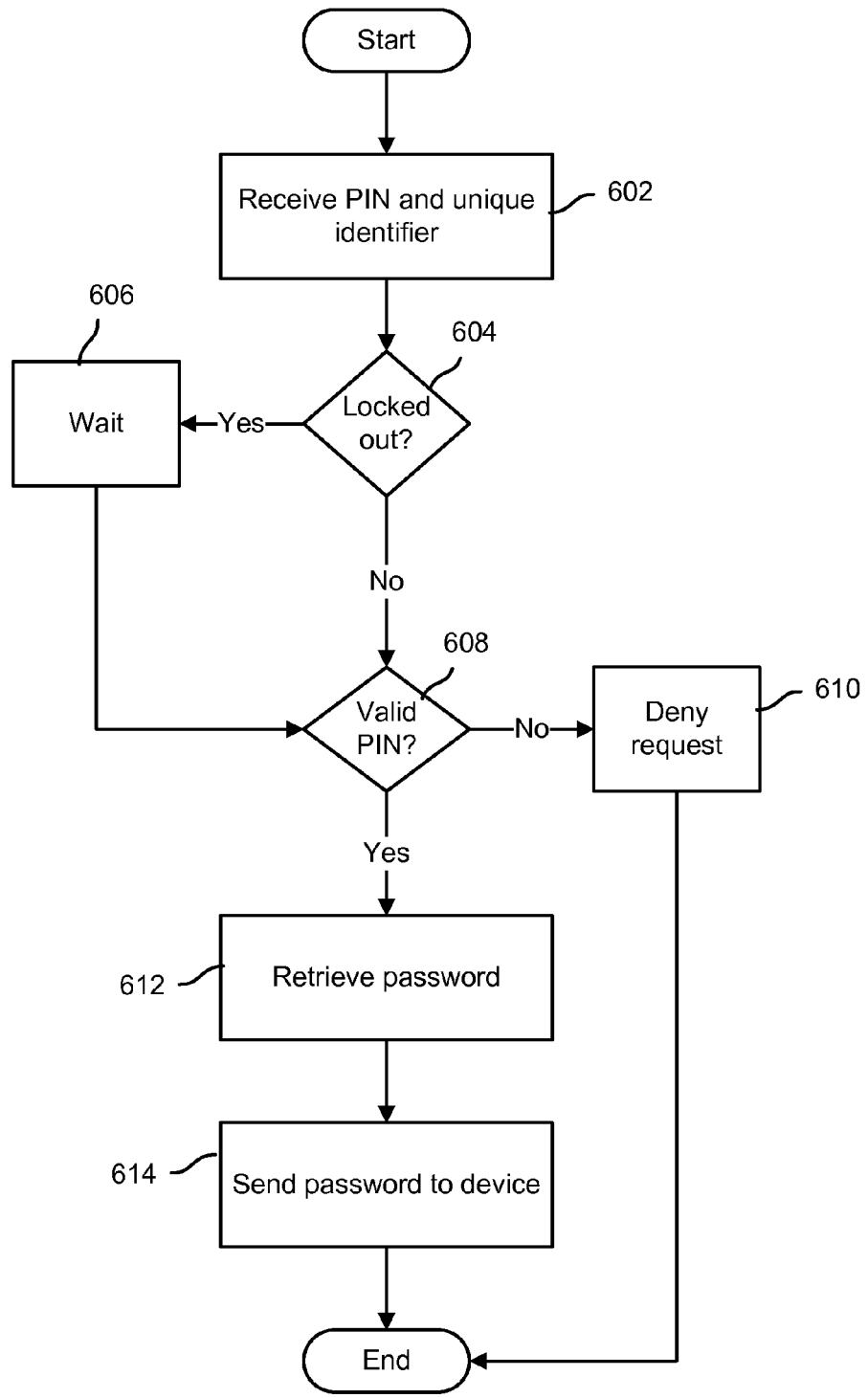
FIG. 6 is a flow chart illustrating an embodiment of a process to provide secure access to a mobile device.

FIG. 6 is a flow chart illustrating an embodiment of a process to provide secure access to a mobile device. In some embodiments, the process of FIG. 6 is implemented on an access management server, such as server 206 of FIG. 2. In this example, when a PIN and unique identifier are received (602), a check is performed to determine whether the requesting mobile device is eligible to have an access attempt processed (604). In various embodiments, the access management server is configured to "throttle" successive requests, for example to render less effective a "brute force" type attempt to gain unauthorized access to the device. In various embodiments, the number of requests that may be processed per unit time may be limited, to any arbitrary number from zero to unlimited, based on one or more factors including by way of example one or more of the number of invalid attempts received within a prescribed time, an IP address from which the request was received, a time of day, a day of the week, and a GPS or other geographic location data associated with the device and/or request. If the device is not currently eligible for an access request to be processed (604), for example because a previous request comprising an invalid PIN was processed too recently, the process waits (606) until the time to request is eligible to be processed arrives. Once the request is eligible to be processed (604, 606), if the PIN is not valid (608) access is denied (610); or, if the PIN is valid (608) the corresponding password is retrieved (612) and sent to the requesting device (614).

Figure 7:
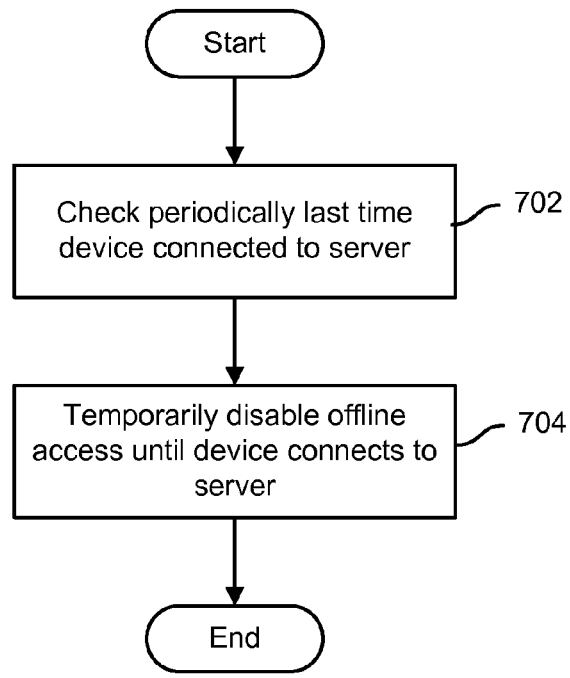
FIG. 7 is a flow chart illustrating an embodiment of a process to provide secure access to a mobile device.

FIG. 7 is a flow chart illustrating an embodiment of a process to provide secure access to a mobile device. In some embodiments, the process of FIG. 7 is implemented on a mobile device. In the example shown, the process checks periodically to determine a last time the mobile device connected successfully with the access management server (702). If too much time since the last connection has passed (702), offline access to data on the mobile device, even if the full password is entered, is disable temporarily, e.g., until the device connects with the server (704). In this way, attempts to crack the password on a lost or stolen device may be prevented from succeeding.

Figure 8:
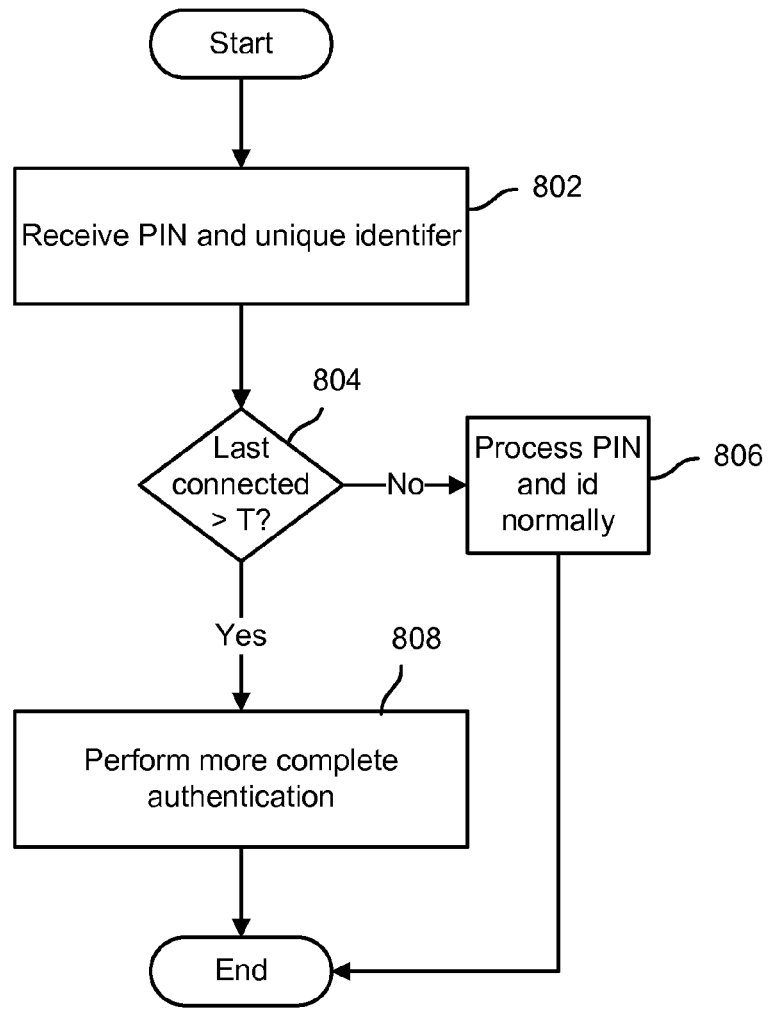
FIG. 8 is a flow chart illustrating an embodiment of a process to provide secure access to a mobile device.

FIG. 8 is a flow chart illustrating an embodiment of a process to provide secure access to a mobile device. In some embodiments, the process of FIG. 8 is implemented by an access management server. In the example shown, on receiving a PIN and unique identifier (802) the server checks to see if the amount of time that has passed since the last time the same device connected to the server, for example with a valid and successful access request, is greater than a prescribed amount of time (804). If not, the PIN and identifier are processed normally (806), for example as in FIG. 5 or 6. However, if greater than the prescribed amount of time since the last server connection has passed (804), then a more complete authentication is perform (808). For example, additional credentials and/or entry of the full password at the mobile device may be requested.

Figure 9:
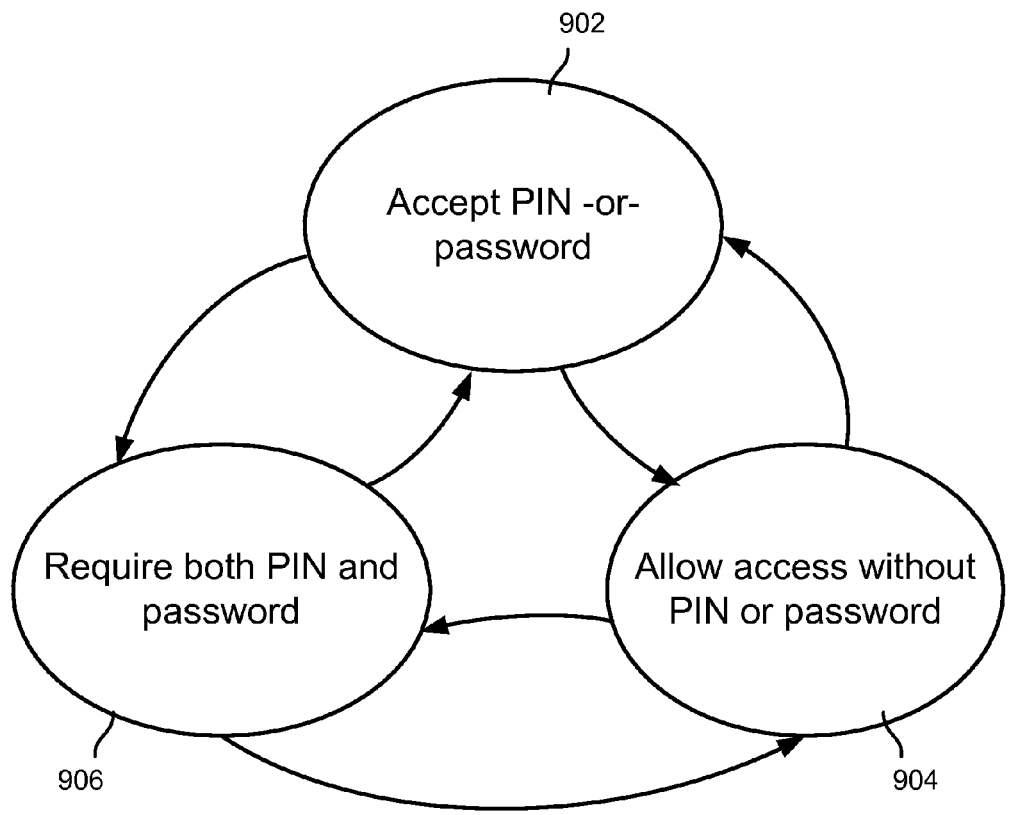
FIG. 9 is a state diagram illustrating an embodiment of a process to provide secure access to a mobile device.

FIG. 9 is a state diagram illustrating an embodiment of a process to provide secure access to a mobile device. In some embodiments, an algorithm is implemented to vary the authentication requirements based on one or more preconfigured conditions. In the example shown, if a first state 902 the mobile device is configured to provide network-assisted access at the option of the user, who may choose to enter just a PIN or instead the full password. Upon occurrence of a transition condition, for example a determination based on location data that the device has been taken into a secure location, such as a secure building associated with the mobile device (home, business site), the process transitions to a second state 904 in which access is permitted without requiring entry of either a PIN or a password. Under prescribed conditions, for example on weekends, after normal work hours, when the device is in an unknown or unsecure location, etc., the process transitions to a third state 906 in which both the PIN and password must be entered at the device to gain access. In the third state 906, for example, a brute force attack focused on one or the other of entering the PIN or the password would not alone be sufficient to gain access.

By providing access using a network-assisted PIN or other short credential, access is made available using an easy to remember and/or enter credential while providing a level of security associated with much more complex passwords.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of providing secure access to a device, comprising:
   receiving a first credential string entered by via a user interface;
   validating the first credential string using trusted code installed at the device;
   in response to determining that the first credential string is valid using the trusted code, sending, to a remote server, an indication that the first credential string has been validated by the trusted code, wherein the remote server compares an amount of time between receiving the indication and a previous indication that a credential string has been validated by the trusted code with a predetermined duration;
   in the event the amount of time is greater than the predetermined duration, receiving from the remote server a request for additional authentication information;
   in the event the amount of time is less than or equal to the predetermined duration, receiving from the remote server a response that includes a second credential string, wherein the second credential string includes more characters than the first credential string; and
   using the second credential string to provide access to data stored on the device.

2. The method of claim 1, wherein the first credential comprises a numeric PIN.

3. The method of claim 1, wherein the first credential string is entered via a user access interface.

4. The method of claim 1, wherein the second credential string comprises a password.

5. The method of claim 1, wherein the second credential string comprises an encryption key.

6. The method of claim 1, wherein using the second credential string to provide access to data stored on the device includes using the second credential string to decrypt data stored in encrypted form on the device.

7. The method of claim 1, wherein the remote server is configured to throttle requests associated with attempts to access the device.

8. The method of claim 1, wherein the remote server is configured to send the second credential string to the device based at least in part on receipt of the indication that the first credential string is valid.

9. The method of claim 1, wherein the device is configured to permit access without sending a request to the remote server upon entry of the second credential string directly at the device.

10. The method of claim 9, wherein the device is configured to require that the device connect with the server prior to access being allowed based at least in part on a determination that greater than a prescribed amount of time has passed since a last connection to the server.

11. The method of claim 1, further comprising displaying a soft numeric keypad based at least in part on a determination that a PIN entry field has been selected.

12. The method of claim 1, wherein the device is configured to require entry at the device by a user of both the first credential string and the second credential string based at least in part on a determination that a maximum security condition has been met.

13. A device configured to provide network-assisted secure access, comprising:
   a communication interface; and
   a processor coupled to the communication interface and configured to:
      receive a first credential string entered by via a user interface;
      validate the first credential string using trusted code installed at the device;
      in response to determining that the first credential string is valid using the trusted code, send, to a remote server, an indication that the first credential string has been validated by the trusted code, wherein the remote server compares an amount of time between receiving the indication and a previous indication that a credential string has been validated by the trusted code with a predetermined duration;
      in the event the amount of time is greater than the predetermined duration, receiving from the remote server a request for additional authentication information;
      in the event the amount of time is less than or equal to the predetermined duration, receive from the remote server via the communication interface a response that includes a second credential string, wherein the second credential string includes more characters than the first credential string; and
      use the second credential string to provide access to data stored on the device.

14. The device of claim 13, wherein the second credential string comprises a password.

15. The device of claim 13, wherein the process is configured to use the second credential string to provide access to data stored on the device at least in part by using the second credential string to decrypt data stored in encrypted form on the device.

16. The device of claim 13, wherein the remote server is configured to throttle requests associated with attempts to access the device by entering values associated with the first credential string.

17. The device of claim 13, wherein the remote server is configured to send the second credential string to the device based at least in part on receipt of the indication that the first credential string is valid.

18. A computer program product to provide secure access, the computer program product being embodied in a tangible, non-transitory computer readable storage medium and comprising computer instructions for:

receiving a first credential string entered by via a user interface;

validating the first credential string using trusted code installed at a device;

in response to determining that the first credential string is valid using the trusted code, sending, to a remote server, an indication that the first credential string has been validated by the trusted code, wherein the remote server compares an amount of time between receiving the indication and a previous indication that a credential string has been validated by the trusted code within a predetermined duration;

in the event the amount of time is greater than the predetermined duration, receiving from the remote server a request for additional authentication information;

in the event the amount of time is less than or equal to the predetermined duration, receiving from the remote server a response that includes a second credential string, wherein the second credential string includes more characters than the first credential string; and using the second credential string to provide access to data stored on the device.

19. The method of claim 1, wherein in response to receiving the indication that the first credential string has been validated, the remote server determines whether the device is eligible to have an access attempt processed.

20. The method of claim 19, wherein the remote server determines whether the device is eligible based at least in part on an IP address from which the request was received.

21. The method of claim 19, wherein the remote server determines whether the device is eligible based at least in part on a time at which the request was received.

22. The method of claim 19, wherein the remote server determines whether the device is eligible based at least in part on geographic location associated with the device.

23. The method of claim 1, further comprising:
receiving a request to access the data stored on the device;
in response to receiving the request to access the data,
determining an amount of time that has passed since the device last connected with the remote server; and
in the event that the amount of time that has passed since the device last connected with the remote server exceeds a threshold amount of time, disabling offline access to the data until the device connects with the remote server.

24. The method of claim 1, wherein the request for additional authentication information comprises:
receiving, from the remote server, a request for an additional credential string to authenticate the user;
receiving a third credential string entered via the user interface, wherein the third credential string is longer than the first credential string; and
sending information associated with the third credential string to the remote server, wherein the remote server determines whether to send the response that includes the second credential string based at least in part on the information associated with the third credential string.

25. The method of claim 1, wherein the indication that the first credential string has been validated by the trusted code does not include the first credential string.

* * * * *